(12) United States Patent
Horowitz et al.

(10) Patent No.: US 6,516,061 B2
(45) Date of Patent: Feb. 4, 2003

(54) SYSTEM FOR AND METHOD OF EXTENDING A PBX PHONE PORT TO A REMOTE PHONE DEVICE

(75) Inventors: Michael Horowitz, Newton, MA (US); Robert Vincent, Newton, MA (US)

(73) Assignee: MCK Communications, Inc., Needham, MA (US)

( * ) Notice: Subject to any disclaimer, the term of this patent is extended or adjusted under 35 U.S.C. 154(b) by 0 days.

(21) Appl. No.: 09/954,958

(22) Filed: Sep. 18, 2001

(65) Prior Publication Data

US 2002/0034293 A1 Mar. 21, 2002

Related U.S. Application Data (60) Provisional application No. 60/234,095, filed on Sep. 20, 2000.

(51) Int. Cl.[7] ............................. H04J 3/12; H04M 3/42; H04M 7/00
(52) U.S. Cl. .................... 379/233; 370/384; 370/426; 370/522; 379/201.01
(58) Field of Search .................. 370/384, 426, 370/522; 379/93.05, 93.14, 231, 232, 233, 234, 201.01

(56) References Cited

U.S. PATENT DOCUMENTS 5,339,356 A * 8/1994 Ishii ........................... 379/225
5,452,347 A * 9/1995 Iglehart et al. .............. 379/157
5,499,289 A    3/1996 Bruno et al. ............. 379/269 X
5,963,620 A   10/1999 Frankel et al. ............ 379/93.05
6,215,796 B1   4/2001 Smith, Jr. .................... 370/493
6,442,256 B1 * 8/2002 Garland et al. .......... 379/106.09

OTHER PUBLICATIONS

Copy of International Search Report dated Feb. 13, 2002.

* cited by examiner

Primary Examiner—Harry S. Hong
(74) Attorney, Agent, or Firm—McDermott, Will & Emery (57) ABSTRACT

A system for establishing a voice and signaling link through a PBX system from an remote telephone device includes a PBX system, a setless gateway, and an remote telephone device. The PBX system is coupled to a public switched telephone network (PSTN) via a trunk connection. The PBX system is also coupled to the setless gateway via a digital phone port, which includes a first bearer channel B1 and a second bearer channel B2. DTMF tone sequences from the remote telephone device are decoded by the setless gateway, which acts as a proxy to the PBX system. The setless gateway routes voice and signaling from the second bearer channel B2 to the first bearer channel B1, so as to extend the remote telephone device from the PBX system.

60 Claims, 4 Drawing Sheets

SYSTEM FOR AND METHOD OF EXTENDING A PBX PHONE PORT TO A REMOTE PHONE DEVICE

CROSS-REFERENCE TO RELATED APPLICATIONS

This application claims the benefit of U.S. Provisional Application No. 60/234,095 entitled "SYSTEM FOR AND METHOD OF EXTENDING A PBX PHONE PORT TO AN EXTERNAL PHONE" filed on Sep. 20, 2000, the disclosure of which is entirely incorporated herein by reference.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to PBX systems, and more particularly, to remotely accessing PBX systems so as to utilize features inherent to the PBX systems via a remote handset, external to the PBX system, such as a standard, third party telephone device.

The majority of in-house telephone systems (e.g., PBX) in use today employ physical telephone units (referred to herein in general as "sets" or "desksets") that are wired into a switching device. The switching device, in conjunction with various processing components, provides a wide range of facilities and features to the deskset user. Such facilities and features include voicemail, call transfer, and conferencing, among others. The deskset is a user interface device that is typically comprised of a microphone/speaker, standardized telephone keypad, feature keys, text display, and other visual displays (e.g., lamps or LEDs), and is used primarily to receive and place telephone calls. The deskset employs a fixed and proprietary protocol for communicating with the switching device. Such protocols are typically restricted by the characteristics of the wire (i.e., the transmission path) that connects the deskset to the switching device.

A disadvantage to such in-house systems is the inability to provide an effective interface for users who do not have access to the deskset-wire-switch configuration (for example, mobile users). Such users may have access to standard third party telephone devices (e.g., cell phones, pay phones, etc.) connected to public telephone networks with public telephone numbers. These users have the ability to place and receive telephone calls via the standard third party devices, but since the third party devices operate independent from the inhouse system, they do not have access to the aforementioned facilities and features provided by their in house telephone system. A number of solutions are currently used to partially solve this problem. For example:

1) Call Forwarding—automatically forwarding all received calls from the in-house system to another telephone device (e.g., cell phone). This solution is a receive-only solution that "blind" transfers the call with no option to return to the user's telephone system in the event of a busy line, ring no answer, or other failure to complete the forwarded call.

2) Attendant Transfer—using a human attendant at the site of the in-house system to answer an incoming call, and transfer it to the telephone device. This solution requires the use of a human attendant and does not support a direct calling to called party paradigm 3) Bridged line appearances with auto-dialing of the telephone device number—similar to Call Forwarding, this solution has the advantage of maintaining the host switch connection until the user answers the call. The limitation of this solution is that it is receive-only and once the call is completed the user cannot utilize any of the normal features associated with their line (e.g., conference or transfer)

4) DISA—allows a user to remotely access a telephone system for placing calls only with no restrictions on calling.

5) Voice Mail out-dialing—similar to DISA but is accessed via the voice mail system. This typically restricts a user to extension dialing only and supports no call control features.

6) Follow-Me features—automated attendants that answer calls on behalf of the user and then intelligently forward or hunt for the user. This call-receiving model is non-concurrent in that the calling party has to interact with an intermediary before reaching the desired party.

7) Off-Premise Extensions—allows a standard deskset to be set up at a remote site for placing/receiving calls. This facility operates on leased lines only and provides no ability to alter the remote telephone device.

As cellular phone networks have proliferated, and cellular phones have become relatively mainstream, many corporate employees routinely maintain two phone numbers: their corporate PBX phone number and their cell phone number. Workers who need to be in constant contact with the office or clients often publish both numbers. Workers then need to maintain two separate voice mailboxes and callers are forced to remember two telephone numbers. Once their cell phone number is published, workers are unable to "disconnect" from the work world and disallow incoming business calls. Typically the cell phone voicemail system is far inferior to the PBX voicemail system, and the worker must learn two different sets of procedures for manipulating voicemail. Workers who are away from their PBX "set" are also denied access to other features that their PBX provides. They are unable to transfer calls or to set up conference calls, and any long distance calls are subject to the cell phone carrier rates, not their corporate PBX long-distance rates.

The "call-forwarding" feature provided by most PBX manufacturers may be used to solve this problem. When away from the digital set in the office, the worker programs the PBX to forward all incoming calls to their cell phone. This approach allows for incoming calls to get re-routed to their cell phones, and if the worker answers the cell phone, the call will be completed. However, if the worker doesn't answer the call (e.g., they are away from the cell phone, the cell phone is turned off, they are on another cell phone call, the cell phone network is congested, or they are in an "out-of-range" location), the call typically does not return to the PBX voicemail. This approach also does not attempt to provide any outgoing dialing features such as 4-digit interoffice dialing, transfer, or conference calls. Another disadvantage to call-forwarding is the fact that when the worker answers an incoming call to the cell phone, there is no way for the worker to know whether the call originated from the PBX as a forwarded call, or whether the call is coming directly from the cellular network. Thus, if the worker goes off-duty and forgets to remove call forwarding, he/she may accept calls that would be better routed to a PBX application such as voice mail, or be handled by an on-duty worker.

It is an object of the present invention to substantially overcome the above-identified disadvantages and drawbacks of the prior art.

SUMMARY OF THE INVENTION

The present invention improves upon the prior art approaches described herein by employing a "Setless Extender" (also referred to herein as "Setless Gateway"), co-located with a local telephone system, e.g., a PBX system, that is equipped with a "proxy" function. As used herein, the term "set" is used to denote a general telephone device. The term "setless" is used herein to describe the lack of a direct connection to a telephone device. Thus, a Setless Extender describes a device, associated with a PBX system, that provides PBX functions to a user without requiring a direct connection from the user to the PBX system. The setless extender is permanently connected to the PBX, but has an on-demand connection to the user. For a "receive" (i.e., incoming) call, the setless extender signals the user's telephone device (by placing a call or some other mechanism) and if the call is answered and accepted, it routes the received call's voice to the telephone device. For a "place" (i.e., outgoing) call, the user connects to the setless extender (by dialing in or some other mechanism), is authenticated (via password and/or dialback), and issues commands to go offhook and send dialing digits. In both cases the setless extender monitors the connection for user commands that can invoke features of the PBX and routes voice from the PBX to the user's telephone device.

The advantages of the proxy as described herein are as follows

1) It is automated
2) It supervises the calls placed and received
3) It rings the telephone device concurrently with the receive call (i.e., the calling party does not experience delay)
4) The user can access all the call features and telephone facilities accessible via their deskset without the need for a physical deskset
5) It extends the line to a remote location
6) It supports "receive" and "place" call usage
7) It can offer more advanced security features
8) It can support a broad range of telephone devices
9) The user can modify its characteristics. For example, the "call forwarding" feature of directing a receive call to a remote, external telephone device can be enabled/disabled via remote commands originated by the user.
10) The user can be notified that a receive call to the extended telephone device is being forwarded from the PBX (i.e., "call acceptance" feature)
11) User can change destination of call forwarding feature "on the fly." If the current destination (e.g., the user's regular cell phone) fails, the user can contact the proxy and change the phone number to which future calls should be forwarded (e.g., to a secondary cell phone or another remote telephone device).

Since the user actively accepts any incoming PBX call, the Setless Extender user can choose to be "connected" to the work world and accept the call, or choose to be "disconnected" and ignore the call. The caller is not forwarded to the worker's cell phone network, but rather stays in the corporate PBX to be typically sent to the worker's corporate voicemail system. The user actually has two options if he/she wishes to be disconnected from the work world. In one case, the user can enable call forwarding, but decline to accept a call that is forwarded. In the other case, the user can disable call forwarding, so that incoming calls to the PBX are handled by the PBX system directly, without being transferred to a remote telephone device.

Users are now able to originate calls from a Setless Extender by using keypad entries to simulate digital deskset actions. For example, pressing '*' '*' '*' equates to <Offhook>; pressing '#' '#' 'T' equates to the <Transfer> key. Outgoing calls originate from the PBX. Calls to the PBX are automatically forwarded to the "Setless" extended phone. Other embodiments of the invention may include decoding non-DTMF voice information as PBX commands (e.g., the user may say "Hold" instead of pressing '#' '#' 'H'.

The foregoing and other objects are achieved by the invention which in one aspect comprises a system for extending a local telephone system to a remote telephone device, including a PBX system that includes a first bearer channel and a second bearer channel, and a setless gateway. The setless gateway is electrically coupled to the first bearer channel and to the second bearer channel of the PBX system. The system establishes a communications path from the remote telephone device to the setless gateway via the second bearer channel of the PBX system. The system further establishes a communications path from the setless gateway to a public switched telephone network via the first bearer channel of the PBX system. The setless gateway provides a communications path between the first bearer channel and the second bearer channel.

In another embodiment of the invention, the setless gateway receives one or more signaling commands from a remote source, and responds to the one or more signaling commands by performing one or more functions corresponding to the one or more signaling commands.

In another embodiment of the invention, the remote source includes the remote telephone device.

In another embodiment of the invention, the remote telephone device produces one or more DTMF signals that correspond to the one or more signaling commands.

In another embodiment of the invention, the setless gateway receives and recognizes one or more voice commands that correspond to the one or more signaling commands.

Another embodiment of the invention further includes a data network coupled to the setless gateway. The data network is also coupled to a computer system such that the setless gateway communicates with the computer system via the data network. The remote source providing the signaling commands includes the computer system.

In another embodiment of the invention, the setless gateway first detects an incoming call from the public switched telephone network via the first bearer channel, then places an outgoing call to the remote telephone device via the second bearer channel.

In another embodiment of the invention, the setless gateway loops the incoming call to the remote telephone device via the second bearer channel if remote telephone device answers the outgoing call.

In another embodiment of the invention, the setless gateway directs the PBX system to handle the incoming call if the remote telephone device does not answer the outgoing call.

In another embodiment of the invention, the remote telephone device provides one or more signaling commands to the setless gateway directing the setless gateway to forward the incoming call to the remote telephone device via the second bearer channel.

In another embodiment of the invention, the remote telephone device provides one or more signaling commands to the setless gateway directing the setless gateway to forward the incoming call to the remote telephone device via the second bearer channel, and to allow the PBX system to handle the incoming call if the remote telephone device does not accept the incoming call.

In another embodiment of the invention, the remote telephone device provides one or more signaling commands to the setless gateway that direct the setless gateway to not forward the incoming call to the remote telephone device via the second bearer channel. Rather, those signaling commands cause the setless gateway to allow the PBX system to handle the incoming call.

In another embodiment of the invention, the remote telephone device places a call to the direct inward dialing number associated with the second bearer channel, the setless gateway directs the PBX system to accept the call from the remote telephone device, and the setless gateway provides a communications path from the second bearer channel to the first bearer channel. In this embodiment, the system provides the remote telephone device access to the public switched telephone network via the PBX system.

In another embodiment of the invention, the setless gateway further requires authentication from the remote telephone device prior to providing the communications path from the second bearer channel to the first bearer channel.

In another embodiment of the invention, the setless gateway further calls the remote telephone device back prior to providing the communications path from the second bearer channel to the first bearer channel.

In another embodiment of the invention, the remote telephone device provides one or more signaling commands to the PBX system through a series path that includes the second bearer channel, the setless gateway, and the first bearer channel.

In another embodiment of the invention, the remote telephone device produces one or more DTMF signals corresponding to the one or more signaling commands.

In another aspect, the invention comprises a system for extending a local telephone system to a remote telephone device. The system includes a first communications path from the remote telephone device to a setless gateway via a second bearer channel of a PBX system. The system also includes a second communications path from the setless gateway to a public switched telephone network via a first bearer channel of the PBX system. The system further includes a third communications path between the first bearer channel and the second bearer channel through the setless gateway. The system provides an overall communications path from the remote device to the public switched telephone network via the PBX system, such that the remote telephone device has access to one or more features provided by the PBX system.

In another aspect, the invention comprises a system for extending a local telephone system to a remote telephone device. The system includes means for establishing a communications path from the remote telephone device to a setless gateway via a second bearer channel of a PBX system. The system also includes means for establishing a communications path from the setless gateway to a public switched telephone network via a first bearer channel of the PBX system. The system also includes means for providing a communications path between the first bearer channel and the second bearer channel through the setless gateway.

In another aspect, the invention comprises an extending system for forwarding an incoming call to a remote telephone device from a local telephone system. The extending system includes a PBX system including a first bearer channel and a second bearer channel, and a setless gateway, electrically coupled to the first bearer channel and the second bearer channel of the PBX system. The setless gateway receives the incoming call via the first bearer channel, the setless gateway establishes a connection to the remote telephone device through the PBX system via the second bearer channel, and the setless gateway routes the first bearer channel to the second bearer channel.

In another embodiment of the invention, the remote telephone device selectively provides a positive acceptance indication to the setless gateway as a condition to accepting the incoming call.

In another embodiment of the invention, the positive acceptance indication includes one or more signaling commands generated by corresponding keystrokes on the remote telephone device.

In another embodiment of the invention, the remote telephone device provides one or more signaling commands to the setless gateway directing the setless gateway to forward the incoming call to the remote telephone device via the second bearer channel.

In another embodiment of the invention, the remote telephone device provides one or more signaling commands to the setless gateway directing the setless gateway not to forward the incoming call to the remote telephone device via the second bearer channel. These signaling commands direct the setless gateway to allow the PBX system to handle the incoming call.

In another aspect, the invention comprises a method of extending a local telephone system to a remote telephone device. The method includes establishing a communications path from the remote telephone device to a setless gateway via a second bearer channel of a PBX system. The method further includes establishing a communications path from the setless gateway to a public switched telephone network via a first bearer channel of the PBX system. The method also includes providing a communications path between the first bearer channel and the second bearer channel through the setless gateway.

In another aspect, the invention comprises an extending system for extending a local telephone system to a remote telephone device. The extending system includes a PBX system having a first bearer channel, a setless gateway, electrically coupled to the first bearer channel of the PBX system, and a direct link from the remote telephone device to the setless gateway. The extending system establishes a communications path from the remote telephone device to the setless gateway via the direct link to the setless gateway. The extending system further establishes a communications path from the setless gateway to a public switched telephone network via the first bearer channel of the PBX system. The setless gateway provides a communications path between the first bearer channel and the second bearer channel.

In another aspect, the invention comprises an extending system for extending a local telephone system to a remote telephone device. The extending system includes a first communications path from the remote telephone device to a setless gateway via a direct link. The extending system further includes a second communications path from the setless gateway to a public switched telephone network via a first bearer channel of the PBX system. The extending system also includes a third communications path between the first bearer channel and the second bearer channel through the setless gateway. The system provides an overall communications path from the remote device to the public switched telephone network via the PBX system, such that the remote telephone device has access to one or more features provided by the PBX system.

In another aspect, the invention comprises a method of extending a local telephone system to a remote telephone device. The method includes providing a first communications path from the remote telephone device to a setless gateway via a direct link to the setless gateway. The method further includes providing a second communications path from the setless gateway to a public switched telephone network via a first bearer channel of a PBX system. The method also includes providing a third communications path between the first bearer channel and the second bearer channel. The method provides an overall communications path from the remote device to the public switched telephone network via the PBX system, such that the remote telephone device has access to one or more features provided by the PBX system.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
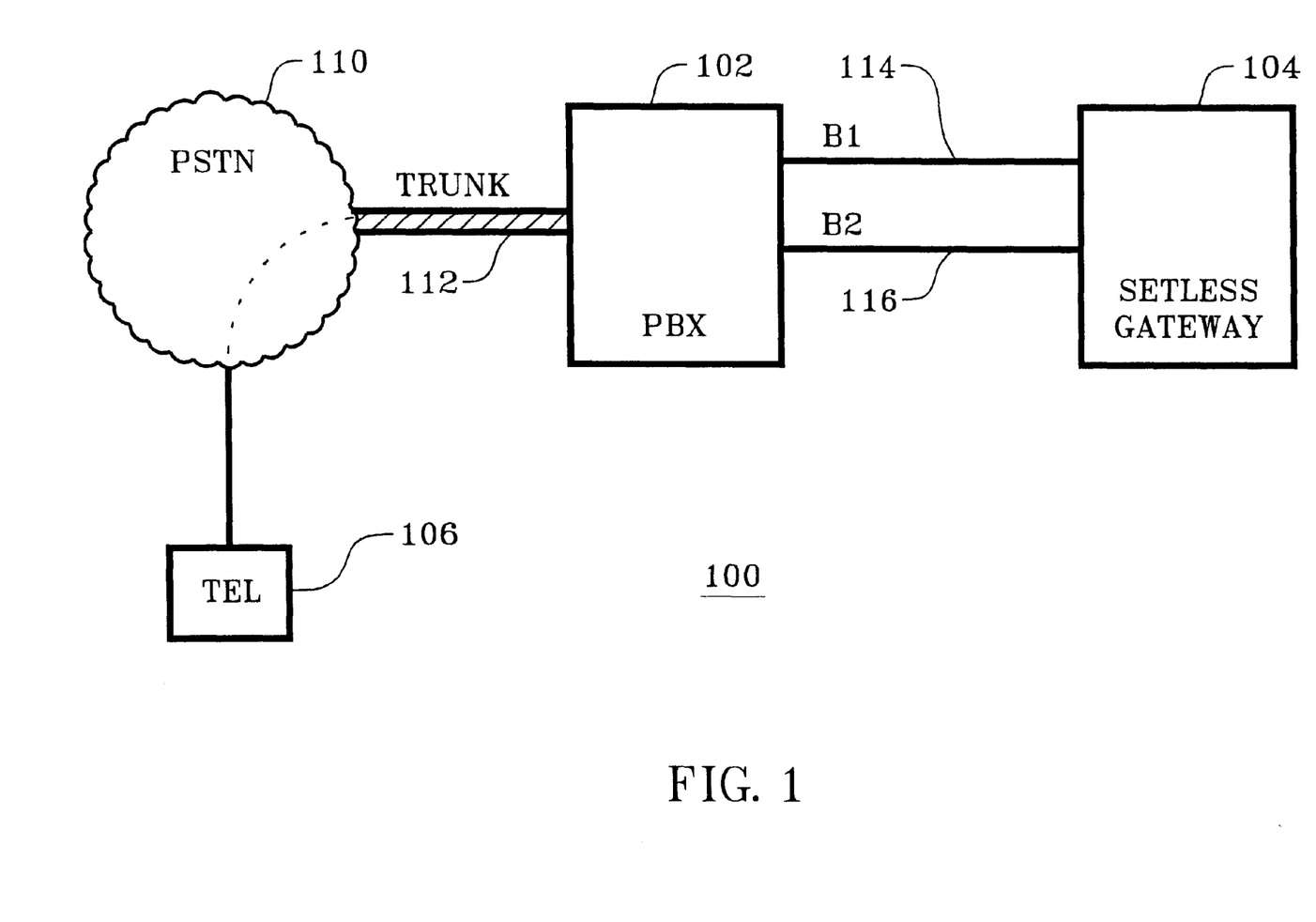
FIG. 1 shows a block diagram of one preferred embodiment of a system for establishing a voice link through a PBX system from an external telephone device.

FIG. 1 illustrates one preferred embodiment of a system 100 for extending a PBX phone port to a remote phone device that is external to the PBX. In general, the system 100 (also referred to herein as a "setless extender" system, or more simply, a "setless extender") establishes a voice link through a PBX system from a remote telephone device. The system 100 includes a PBX system 102, a setless gateway 104, and a remote telephone device 106 (also referred to herein as "remote analog/cellular phone"). The PBX system 102 is coupled to a public switched telephone network (PSTN) 110 via a trunk connection 112. The PBX system 102 is also coupled to the setless gateway 104 via a first bearer channel 114 (B1) and a second bearer channel 116 (B2). In addition to voice, the telephone device 106 provides all signaling functions necessary to the PBX system 102 and the setless gateway 104. The setless gateway 104 is a device that connects to the "line-side" port of the PBX system 102. The setless gateway 104 monitors signaling functions from the remote telephone device 106 through the PBX system 102, and originates originate signaling functions to send to the PBX system 102.

Typical PBX digital ports have two "bearer" channels, the first bearer channel (also referred to herein as the "B1" channel) and the second bearer channel (also referred to herein as the "B2" channel). The B1 channel is typically used to carry voice and signaling commands from a digital deskset to the PBX system 102. The B2 channel is only used by special sets that have a second port to enable an analog phone or fax machine. The B1 channel and the B2 channel may each be associated with a unique DID (Direct-Inward-Dialing) number that allows a caller to access the channel via the PSTN 110. The setless gateway 104 uses this B2 channel to extend voice and signaling from the PSTN 110 connected phone. It can then programmatically route the voice and signaling from the B2 channel to the B1 channel after answering an incoming call on the B1 channel, or when originating a call on the B1 channel. The PBX digital port to which the setless gateway 104 is connected is referred to herein as the "extended port."

In a preferred embodiment, a user extends a PBX phone port via the setless gateway 104 by calling the DID (Direct-Inward-Dialing) number associated with the B2 channel of the PBX system 102 from the remote analog/cellular phone 106. The setless gateway 104 detects the incoming call via the B2 channel, and sends an <offhook> signaling command to the PBX system 102. The PBX system 120 responds to the <offhook> command by accepting (i.e., answering) the call. In one embodiment, the user may be required to provide authentication via a numeric password once the PBX system 102 accepts the call. In another embodiment, the system 100 may initiate a "dialback" to the user (i.e., the Gateway disconnects the incoming call, then calls back to a pre-configured dialback number). In yet another embodiment, the system may both require the user to provide authentication, and initiate a callback.

Once the user has established a communications path from the remote device 106 through the PBX system 102 to the setless gateway 104 (i.e., the user is "extended"), the setless gateway 104 provides what is essentially a loopback function for the user to the B1 port of the PBX system 102. From the point of view of the PBX system 102 at the B1 port, the user communicating with a remote phone device through the setless gateway 104 is indistinguishable from an ordinary deskset. In other words, the user communicates with the PBX system 102 via a remote phone device as if he/she was using the deskset in the office. The setless gateway 104 emulates a deskset at the B1 port, and the remote phone device provides voice and signaling commands for the deskset emulation through the B2 channel. The user can thus initiate an outgoing phone call through the PBX via the B1 channel by using the setless gateway 104 as a proxy.

The setless gateway 104 may also be used to produce a call-forwarding extension feature, i.e., to extend incoming calls through the PBX system 102 to a remote phone device. An "incoming call" as defined herein is a telephone call made through the PSTN 110 to the DID number associated with the B1 channel (and thus to the user's normal deskset unit). The setless gateway maintains the PSTN phone number associated with the remote analog/cellular phone 106 as a result of its configuration. When the setless gateway 104 detects signaling at the PBX B1 port that indicates an incoming call, the setless gateway 104 attempts to call the remote analog/cellular phone 106 via the PBX B2 port. To place a call to the remote phone 106, the setless gateway 104 sends signaling to the B2 port to go <offhook>, monitors the B2 port for a dial tone, then dials the PSTN phone number associated with the remote analog/cellular phone 106. When the user answers the call from the setless gateway 104, the setless gateway 104 answers the incoming call and loops the answered call from the B1 channel to the B2 channel, and thus out to the remote analog/cellular phone 106. If the user does not answer the call from the setless gateway 104 via the B2 channel after a predetermined amount of time, the gateway directs the PBX system 102 (via signaling commands) to handle the call as it would other unanswered calls. Alternately, the PBX system 102 may be programmed to automatically handle the incoming call after a predetermined amount of time unanswered.

In one embodiment, the user can disable the "call forwarding" extension feature, such that incoming calls are not forwarded to the remote analog/cellular phone 106, and are instead transferred to a PBX function (e.g., voicemail) of the PBX system 102. While the forwarding feature is disabled, the user can still contact the setless gateway 104 via the PSTN 110 and the B2 channel of the PBX 102 to place an outgoing call as described herein. Likewise, the user can contact the setless gateway 104 to enable the forwarding function of the invention.

In general, the user provides commands to the setless gateway 104 via the remote device 106 to exercise control of the gateway 104. In one preferred embodiment, the user may use keypad (also referred to herein as "dialpad") keystrokes to send coded messages to the setless gateway 104. Each keypad key stroke produces a DTMF (dual tone, multifrequency) signal that is transmitted along with voice. The gateway decodes the DTMF tones to dialpad keys, then further decodes sequences of keypad keys to digital set actions for the B1 channel. For each keypad key sequence, the inter-key time interval for the first two repeated characters is preferably less than 750 milliseconds, although other inter-key time intervals may also be used. By translating DTMF "commands" and generating the appropriate PBX signaling, the system 100 creates a virtual digital handset at a remote location. In some embodiments, the invention utilizes one or more commands represented by DTMF tones (or other signaling means known in the art) to control the PBX 102 and the setless gateway 104. A single pattern of DTMF tones may convey multiple commands, depending upon the circumstances. For example, in one embodiment the '*' '*' '*' sequence is used as a general "Do the right thing" command, depending on the current circumstances. For example, the '*' '*' '*' sequence may be used as shown in the following circumstances:

1. If currently on-hook, go off-hook.
2. If currently on a call, put current call on Hold, go off-hook on next line.
3. If on a call, but another incoming call is available, put current call on Hold, answer new incoming call.
4. If currently on a call, and another call is currently on Hold, put current call on Hold, switch to other call.

Other sequences may be similarly used to convey other commands for other sets of circumstances. Further, other means for conveying the commands to the gateway 104 may also be used. For example, the user may utter voice commands that are subsequently transmitted via a voice channel, and are converted by voice recognition apparatus into commands for the gateway 104.

The following scenarios provide specific examples of how the system 100 may be used to perform various general functions as described herein. These scenarios are meant to be illustrative only and are not intended to define limits of the invention.

OUTGOING CALL EXAMPLE

Once extended, the user sequentially enters three stars (i.e., '*' '*' '*') on the keypad of the remote analog/cellular phone 106. These tones are received as voice data on the B2 channel at the gateway, and decoded back into the sequence '*' '*' '*'. The gateway then sends the PBX specific <offhook> signal via the B1 channel. The PBX system 102 receives the <offhook> indication, and sends a dial-tone as voice back on the B1 channel. The setless gateway 104 routes the B1 voice directly out to the B2 channel to the analog/cellular phone 106 where the user hears the PBX dial tone. The user then presses dialpad keys to make a call. Again, these key strokes generate DTMF tones which are decoded by the setless gateway 104 and then sent as keystroke signaling data to the B1 channel. Because the B1 channel is directly routed to the B2 channel, the extended user hears any call progress tones, and if the call is answered, is able to converse with the called party.

INCOMING CALL EXAMPLE #1

By configuration, the setless gateway 104 stores the phone number of the analog/cellular phone 106 that it is extending. If the gateway receives B1 signaling that indicates an incoming call, the setless gateway 104 will attempt to call the extended analog/cellular phone by sending signaling on the B2 channel to go <offhook>. The setless gateway 104 will monitor the voice channel for a dial-tone, then dial the phone number of the extended device 106 via DTMF tones. During this time the caller is unaware of this activity and hears only standard ring tones. The gateway will not accept the call on the B1 channel, and subsequently route its voice to the B2 channel, until the extended user answers the call on the B2 channel. In one embodiment, the system 100 may be configured to force the user to indicate acceptance of the incoming call by pressing a key and sending a DTMF tone. This "active call acceptance" ensures that only the user will cause the call to be answered and routed through the setless gateway 104 to the B2 channel. If the user does not answer the B2 channel call, or chooses not to accept the B1 channel call, the call will not be routed through the gateway 104 and will instead be handled by the PBX system 102, e.g., by the PBX voice-mail function. In some embodiments, the user can selectively disable or enable the active call acceptance capability via one or a series of DTMF tones.

INCOMING CALL EXAMPLE #2

When the user is extended and connected to an existing call (incoming or outgoing), if the gateway receives B1 channel signaling indicating another incoming call, the gateway will preferably generate a 500 millisecond tone to indicate to the user the incoming call, although other similar indications may also be used. The gateway also decodes the DN or Feature Key required to accept the second call pending on the B1 channel. The user then presses '*' '*' '*' (or other predetermined keystroke code) to accept the call. The setless gateway 104 sends signaling commands to the PBX system 102 via the B1 channel to simulate the press and release of the <Hold> key, thereby putting any existing call on <Hold>. The setless gateway 104 answers the call by sending signaling commands to the PBX system 102 to similarly simulate the press of the DN or Feature Key associated with the incoming call.

This embodiment of system 100 as described herein works because one PBX signaling/voice channel is used to control another PBX port's signaling/voice channel. In another embodiment, the source of the signaling commands is not an analog/cellular phone, but rather includes a PC application connected to the setless gateway via a LAN or WAN. In this case, the invention uses network based transport for the "commands", but the voice path uses the same B1/B2 routing as with the Setless Extender.

The Setless Extender can also use another B1 channel instead of the extended B1 channel's B2 channel to facilitate PBX connectivity.

As Internet services are added to most cellular phone providers, the system 100 can use that technology to perform more complex functions, such as sending Caller ID information to the cell phone display, transcribing voice mail left at the PBX system 102 and sending the transcribed voice mail as an e-mail message, etc.

Figure 2:
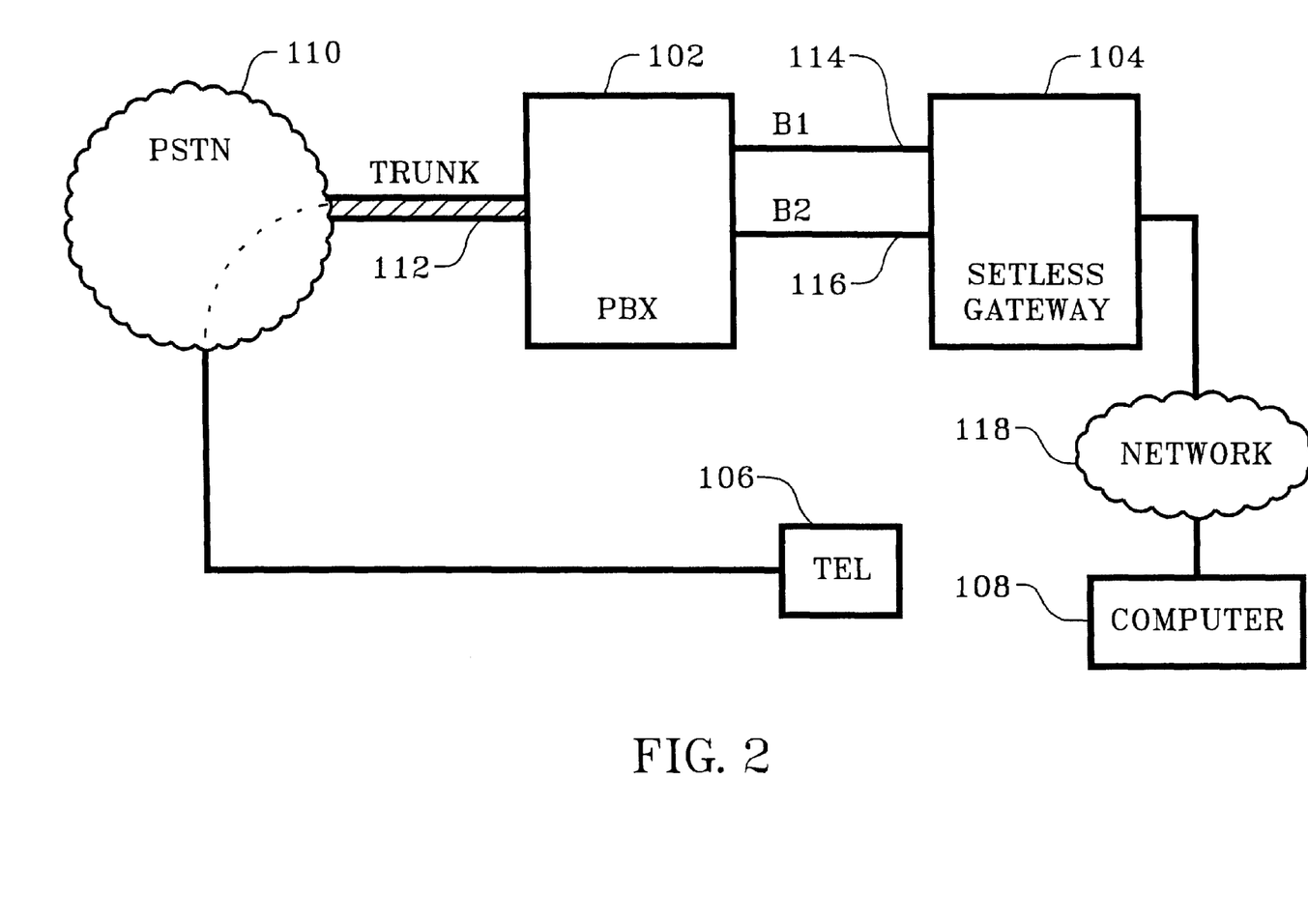
FIG. 2 shows a block diagram of another embodiment of the system shown in FIG. 1.

In the alternate embodiment shown in FIG. 2, a computer 108 is coupled to the setless gateway 104. The connection between the computer 108 and the gateway 104 may include a direct wiring connection, or it may include a connection through a network 118 such as a local area network (LAN), wide area network (WAN) or the Internet. In this embodiment, the telephone device 106 provides voice channel and signaling for the initial connection through the PBX system 102 via the B2 channel as described herein, while the computer 108 provides signaling data for other PBX functions and setless gateway functions. The remote telephone device 106 can perform the same functions as it does in the embodiment shown in FIG. 1; the only difference is that the signaling functions used to control the setless gateway 104 and the PBX system 102 originate from the computer 108 rather than the remote telephone device 106.

Figure 3:
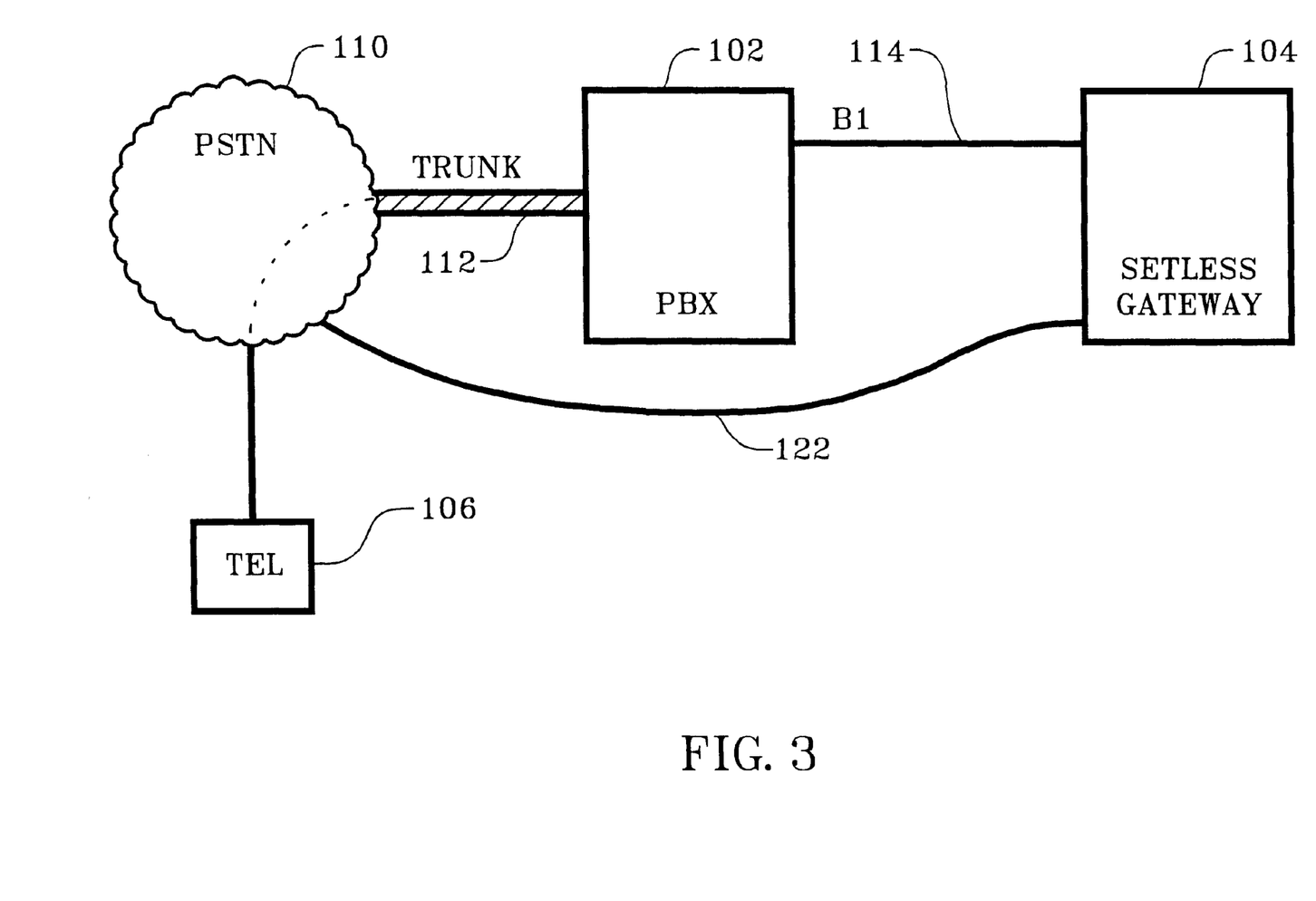
FIG. 3 shows a block diagram of another embodiment of the system shown in FIG. 1; and, FIG. 4 shows a block diagram of yet another embodiment of the system shown in FIG. 1.

In yet another embodiment, shown in FIG. 3, a direct link 122 from the PSTN 110 to the setless gateway 104 replaces the B2 channel 116 of FIG. 1. This direct link may include a trunk line, a DS0 channel, or other means for conveying voice and signaling information known in the art. In this embodiment, the extended telephone set 106 communicates with the setless gateway 104 via the direct link 122 from the PSTN 110, rather than the B2 channel as in FIG. 1. The setless gateway 104 then routes the voice and signaling data from the direct link 122 to the B1 channel of the PBX 102 to create the extension. Note that with the configuration shown in FIG. 3, all that has changed is the actual communications path from the remote telephone device 106 to the setless gateway 104. The remote telephone device 106 can perform the same functions and operate in the same manner as it does in the embodiment shown in FIG. 1. The remote telephone device 106 can still complete calls to the PSTN using the PBX via the setless gateway 104, and the remote telephone device 106 can still receive calls forwarded by the PBX through the setless gateway 104.

In another embodiment, the system 100 supplements its DTMF tone commands by recognizing voiced commands. In such an embodiment, the user states a command through the extended telephone set 106, such as "HOLD." The setless gateway 104 recognizes the voiced command and implements an appropriate action depending on the current conditions. For example, if the user is currently on a call, and the system indicates to the user that a second call is available, a voiced command of "HOLD" would place the current call on hold and route the second incoming call to the user. The setless gateway 104 may use any of several voice recognition systems known in the art to transform the spoken command to a form that is compatible with the signaling commands as described herein.

Figure 4:
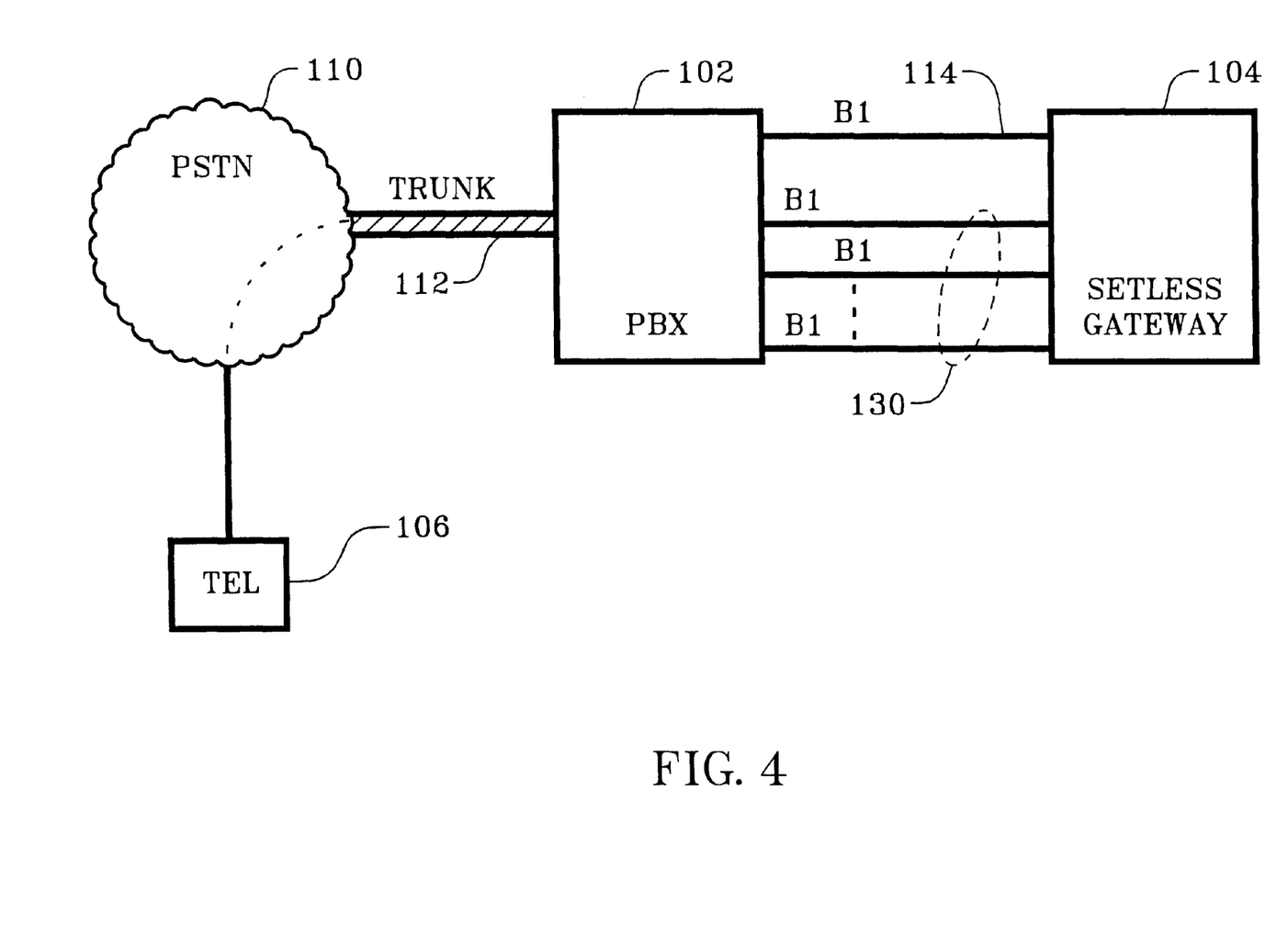

Another embodiment of the invention, shown in FIG. 4, is useful for PBX systems that do not support B2 channels. In this embodiment, one or more B1 channels 130 are designated to provide access to the setless gateway 104 for the extended telephone 106. Thus, the one or more B1 channels 130 replace the B2 channel 116 of FIG. 1. The extended telephone set 106 communicates with the setless gateway 104 via one of the designated B1 channels 130, rather than the B2 channel as shown in FIG. 1. The setless gateway then routes the voice and signaling data from the designated B1 channel 130 to the "client line" B1 channel of the PBX 102 to create the extension. With the the configuration shown in FIG. 4, all that has changed is the actual communications path from the remote telephone device 106 to the setless gateway 104 (with respect to FIG. 1). The remote telephone device 106 can perform the same functions and operate in the same manner as it does in the embodiment shown in FIG. 1. The remote telephone device 106 can still complete calls to the PSTN using the PBX via the setless gateway 104, and the remote telephone device 106 can still receive calls forwarded by the PBX through the setless gateway 104.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for extending a local telephone system to a remote telephone device, comprising:
   a PBX system for at least partially implementing the local telephone system, including a first bearer channel and a second bearer channel; and,
   a setless gateway, electrically coupled to the first bearer channel and to the second bearer channel of the PBX system;
   wherein (i) the system establishes a communications path from the remote telephone device to the setless gateway via the public switched telephone network and subsequently the second bearer channel of the PBX system, (ii) the system establishes a communications path from the setless gateway to a public switched telephone network via the first bearer channel of the PBX system, and (iii) the setless gateway provides a communications path between the first bearer channel and the second bearer channel.

2. A system according to claim 1, wherein the setless gateway receives one or more signaling commands from a remote source, and responds to the one or more signaling commands by performing one or more functions corresponding to the one or more signaling commands.

3. A system according to claim 2, wherein the remote source includes the remote telephone device.

4. A system according to claim 3, wherein the remote telephone device produces one or more DTMF signals corresponding to the one or more signaling commands.

5. A system according to claim 2, wherein the setless gateway receives and recognizes one or more voice commands corresponding to the one or more signaling commands.

6. A system according to claim 2, further including a data network coupled to the setless gateway, and coupled to a computer system such that the setless gateway communicates with the computer system via the data network, wherein the remote source includes the computer system.

7. A system according to claim 1, wherein the setless gateway first detects an incoming call from the public switched telephone network via the first bearer channel, then places an outgoing call to the remote telephone device via the second bearer channel.

8. A system according to claim 7, wherein the setless gateway loops the incoming call to the remote telephone device via the second bearer channel if remote telephone device answers the outgoing call.

9. A system according to claim 7, wherein the setless gateway directs the PBX system to handle the incoming call if the remote telephone device does not answer the outgoing call.

10. A system according to claim 7, wherein the remote telephone device provides one or more signaling commands to the setless gateway directing the setless gateway to forward the incoming call to the remote telephone device via the second bearer channel.

11. A system according to claim 7, wherein the remote telephone device provides one or more signaling commands to the setless gateway directing the setless gateway to (i) forward the incoming call to the remote telephone device via the second bearer channel, and (ii) allow the PBX system to handle the incoming call if the remote telephone device does not accept the incoming call.

12. A system according to claim 7, wherein the remote telephone device provides one or more signaling commands to the setless gateway directing the setless gateway not to forward the incoming call to the remote telephone device via the second bearer channel, but to allow the PBX system t o handle the incoming call.

13. A system according to claim 1, wherein the remote telephone device places a call to the direct inward dialing number associated with the second bearer channel, the setless gateway directs the PBX system to accept the call from the remote telephone device, and the setless gateway provides a communications path from the second bearer channel to the first bearer channel, so as to provide the remote telephone device access to the public switched telephone network via the PBX system.

14. A system according to claim 13, wherein the setless gateway further requires authentication from the remote telephone device prior to providing the communications path from the second bearer channel to the first bearer channel.

15. A system according to claim 13, wherein the setless gateway further calls the remote telephone device back prior to providing the communications path from the second bearer channel to the first bearer channel.

16. A system according to claim 13, wherein the remote telephone device provides one or more signaling commands to the PBX system through a series path that includes the second bearer channel, the setless gateway, and the first bearer channel.

17. A system according to claim 16, wherein the remote telephone device produces one or more DTMF signals corresponding to the one or more signaling commands.

18. A system for extending a local telephone system to a remote telephone device, comprising:
- a first communications path from the remote telephone device to a setless gateway via the public switched telephone network and subsequently a second bearer channel of a PBX system, wherein the PBX system at least partially implements the local telephone system;
- a second communications path from the setless gateway to a public switched telephone network via a first bearer channel of the PBX system; and,
- a third communications path between the first bearer channel and the second bearer channel through the setless gateway;
- wherein the system provides an overall communications path from the remote device to the public switched telephone network via the PBX system, such that the remote telephone device has access to one or more features provided by the PBX system.

19. A system according to claim 18, wherein the setless gateway receives one or more signaling commands from a remote source, and responds to the one or more signaling commands by performing one or more functions corresponding to the one or more signaling commands.

20. A system according to claim 19, wherein the remote source includes the remote telephone device.

21. A system according to claim 20, wherein the remote telephone device produces one or more DTMF signals corresponding to the one or more signaling commands.

22. A system according to claim 19, wherein the setless gateway receives and recognizes one or more voice commands corresponding to the one or more signaling commands.

23. A system according to claim 19, further including a data network coupled to the setless gateway, and coupled to a computer system such that the setless gateway communicates with the computer system via the data network, wherein the remote source includes the computer system.

24. A system according to claim 18, wherein the setless gateway first detects an incoming call from the public switched telephone network via the first bearer channel, then places an outgoing call to the remote telephone device via the second bearer channel.

25. A system according to claim 24, wherein the setless gateway loops the incoming call to the remote telephone device via the second bearer channel if remote telephone device answers the outgoing call.

26. A system according to claim 24, wherein the setless gateway directs the PBX system to handle the incoming call if the remote telephone device does not answer the outgoing call.

27. A system according to claim 24, wherein the remote telephone device provides one or more signaling commands to the setless gateway directing the setless gateway to forward the incoming call to the remote telephone device via the second bearer channel.

28. A system according to claim 24, wherein the remote telephone device provides one or more signaling commands to the setless gateway directing the setless gateway to (i) forward the incoming call to the remote telephone device via the second bearer channel, and (ii) allow the PBX system to handle the incoming call if the remote telephone device does not accept the incoming call.

29. A system according to claim 24, wherein the remote telephone device provides one or more signaling commands to the setless gateway directing the setless gateway not to forward the incoming call to the remote telephone device via the second bearer channel, but to allow the PBX system to handle the incoming call.

30. A system according to claim 18, wherein the remote telephone device places a call to the direct inward dialing number associated with the second bearer channel, the setless gateway directs the PBX system to accept the call from the remote telephone device, and the setless gateway provides a communications path from the second bearer channel to the first bearer channel, so as to provide the remote telephone device access to the public switched telephone network via the PBX system.

31. A system according to claim 30, wherein the setless gateway further requires authentication from the remote telephone device prior to providing the communications path from the second bearer channel to the first bearer channel.

32. A system according to claim 30, wherein the setless gateway further calls the remote telephone device back prior to providing the communications path from the second bearer channel to the first bearer channel.

33. A system according to claim 30, wherein the remote telephone device provides one or more signaling commands to the PBX system through a series path that includes the second bearer channel, the setless gateway, and the first bearer channel.

34. A system according to claim 33, wherein the remote telephone device produces one or more DTMF signals corresponding to the one or more signaling commands.

35. A system for extending a local telephone system to a remote telephone device, comprising:
- means for establishing a communications path from the remote telephone device to a setless gateway via the public switched telephone network and subsequently a second bearer channel of a PBX system, wherein the PBX system at least partially implements the local telephone system;

means for establishing a communications path from the setless gateway to a public switched telephone network via a first bearer channel of the PBX system;

means for providing a communications path between the first bearer channel and the second bearer channel through the setless gateway.

36. A system for forwarding an incoming call to a remote telephone device from a local telephone system, comprising:

a PBX system for at least partially implementing the local telephone system including a first bearer channel and a second bearer channel; and, a setless gateway, electrically coupled to the first bearer channel and the second bearer channel of the PBX system;

wherein (i) the setless gateway receives the incoming call via the first bearer channel, (ii) the setless gateway establishes a connection to the remote telephone device through the PBX system via the second bearer channel and subsequently the public switched telephone network, and (iii) the setless gateway routes the first bearer channel to the second bearer channel.

37. A system according to claim 36, wherein the remote telephone device selectively provides a positive acceptance indication to the setless gateway as a condition to accepting the incoming call.

38. A system according to claim 37, wherein the positive acceptance indication includes one or more signaling commands generated by corresponding keystrokes on the remote telephone device.

39. A system according to claim 36, wherein the remote telephone device provides one or more signaling commands to the setless gateway directing the setless gateway to forward the incoming call to the remote telephone device via the second bearer channel.

40. A system according to claim 36, wherein the remote telephone device provides one or more signaling commands to the setless gateway directing the setless gateway not to forward the incoming call to the remote telephone device via the second bearer channel, but to allow the PBX system to handle the incoming call.

41. A method of extending a local telephone system to a remote telephone device, comprising:

establishing a communications path from the remote telephone device to a setless gateway via the public switched telephone network and subsequently a second bearer channel of a PBX system, wherein the PBX system at least partially implements the local telephone system;

establishing a communications path from the setless gateway to a public switched telephone network via a first bearer channel of the PBX system; and, providing a communications path between the first bearer channel and the second bearer channel through the setless gateway.

42. A method according to claim 41, further including receiving at the setless gateway one or more signaling commands from a remote source, and responding to the one or more signaling commands by performing one or more functions corresponding to the one or more signaling commands.

43. A method according to claim 42, wherein the remote source includes the remote telephone device.

44. A method according to claim 43, further including producing one or more DTMF signals corresponding to the one or more signaling commands.

45. A method according to claim 42, further including receiving and recognizing one or more voice commands that correspond to the one or more signaling commands.

46. A method according to claim 42, further including a data network coupled to the setless gateway, and coupled to a computer system such that the setless gateway communicates with the computer system via the data network, wherein the remote source includes the computer system.

47. A method according to claim 41, wherein the setless gateway first detects an incoming call from the public switched telephone network via the first bearer channel, then places an outgoing call to the remote telephone device via the second bearer channel.

48. A method according to claim 47, wherein the setless gateway loops the incoming call to the remote telephone device via the second bearer channel if remote telephone device answers the outgoing call.

49. A method according to claim 47, wherein the setless gateway directs the PBX system to handle the incoming call if the remote telephone device does not answer the outgoing call.

50. A method according to claim 47, providing, via the remote telephone device, one or more signaling commands to the setless gateway that directs the setless gateway to forward the incoming call to the remote telephone device via the second bearer channel.

51. A method according to claim 47, providing, via the remote telephone device one or more signaling commands to the setless gateway that directs the setless gateway to (i) forward the incoming call to the remote telephone device via the second bearer channel, and (ii) allow the PBX system to handle the incoming call if the remote telephone device does not accept the incoming call.

52. A method according to claim 47, wherein the remote telephone device provides one or more signaling commands to the setless gateway directing the setless gateway not to forward the incoming call to the remote telephone device via the second bearer channel, but to allow the PBX system to handle the incoming call.

53. A method according to claim 52, wherein the remote telephone device places a call to the direct inward dialing number associated with the second bearer channel, the setless gateway directs the PBX system to accept the call from the remote telephone device, and the setless gateway provides a communications path from the second bearer channel to the first bearer channel, so as to provide the remote telephone device access to the public switched telephone network via the PBX system.

54. A method according to claim 53, wherein the setless gateway further requires authentication from the remote telephone device prior to providing the communications path from the second bearer channel to the first bearer channel.

55. A method according to claim 53, wherein the setless gateway further calls the remote telephone device back prior to providing the communications path from the second bearer channel to the first bearer channel.

56. A method according to claim 53, wherein the remote telephone device provides one or more signaling commands to the PBX system through a series path that includes the second bearer channel, the setless gateway, and the first bearer channel.

57. A method according to claim 56, wherein the remote telephone device produces one or more DTMF signals corresponding to the one or more signaling commands.

58. A system for extending a local telephone system to a remote telephone device, comprising:

a PBX system for at least partially implementing the local telephone system, including a first bearer channel;

a setless gateway, electrically coupled to the first bearer channel of the PBX system; and, a direct link from the remote telephone device via the public switched telephone network to the setless gateway;

wherein (i) the system establishes a communications path from the remote telephone device to the setless gateway via the direct link to the setless gateway, (ii) the system establishes a communications path from the setless gateway to a public switched telephone network via the first bearer channel of the PBX system, and (iii) the setless gateway provides a communications path between the first bearer channel and the direct link from the remote telephone device.

59. A system for extending a local telephone system to a remote telephone device, comprising:

a first communications path from the remote telephone device to a setless gateway via a direct link including a path through the public switched telephone network;

a second communications path from the setless gateway to a public switched telephone network via a first bearer channel of a PBX system, wherein the PBX system at least partially implements the local telephone system; and, a third communications path between the first bearer channel and the direct link through the setless gateway;

wherein the system provides an overall communications path from the remote device to the public switched telephone network via the PBX system, such that the remote telephone device has access to one or more features provided by the PBX system.

60. A method of extending a local telephone system to a remote telephone device, comprising:

providing a first communications path from the remote telephone device to a setless gateway via a direct link to the setless gateway, including a path through the public switched telephone network;

providing a second communications path from the setless gateway to a public switched telephone network via a first bearer channel of a PBX system, wherein the PBX system at least partially implements the local telephone system; and, providing a third communications path between the first bearer channel and the direct link;

so as to provides an overall communications path from the remote device to the public switched telephone network via the PBX system, such that the remote telephone device has access to one or more features provided by the PBX system.

* * * * *